(12) United States Patent
Kitsukawa

(10) Patent No.: US 8,456,320 B2
(45) Date of Patent: Jun. 4, 2013

(54) FEEDBACK WITH FRONT LIGHT

(75) Inventor: Tadamasa Kitsukawa, Cupertino, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 733 days.

(21) Appl. No.: 12/273,156

(22) Filed: Nov. 18, 2008

(65) Prior Publication Data
US 2010/0123597 A1    May 20, 2010

(51) Int. Cl.
*G08B 5/22*    (2006.01)

(52) U.S. Cl.
USPC . 340/815.45; 250/221; 340/500; 340/539.22; 340/407.2; 340/815.42; 345/156; 345/173; 345/174; 345/175; 345/176; 345/177; 345/178

(58) Field of Classification Search
None
See application file for complete search history.

(56) References Cited

U.S. PATENT DOCUMENTS

| | | | | |
|---|---|---|---|---|
| 5,900,876 | A * | 5/1999 | Yagita et al. | 715/776 |
| 6,972,752 | B2 * | 12/2005 | Nako et al. | 345/173 |
| 7,136,061 | B2 * | 11/2006 | Cordner | 345/419 |
| 7,853,900 | B2 * | 12/2010 | Nguyen et al. | 715/861 |
| 8,018,431 | B1 * | 9/2011 | Zehr et al. | 345/156 |
| 8,284,167 | B2 * | 10/2012 | Li et al. | 345/173 |
| 2002/0063695 | A1 * | 5/2002 | Canova, Jr. | 345/173 |
| 2003/0020687 | A1 * | 1/2003 | Sowden et al. | 345/157 |
| 2004/0026605 | A1 * | 2/2004 | Lee et al. | 250/221 |
| 2004/0056605 | A1 | 3/2004 | Yoshida | |
| 2006/0236262 | A1 * | 10/2006 | Bathiche et al. | 715/786 |
| 2006/0279533 | A1 | 12/2006 | Hsieh | |
| 2008/0055261 | A1 * | 3/2008 | Cernasov | 345/173 |
| 2009/0102805 | A1 * | 4/2009 | Meijer et al. | 345/173 |
| 2009/0167719 | A1 * | 7/2009 | Woolley | 345/174 |
| 2009/0179853 | A1 * | 7/2009 | Beale | 345/156 |
| 2009/0237367 | A1 * | 9/2009 | Ryu et al. | 345/173 |
| 2009/0244020 | A1 * | 10/2009 | Sjolin | 345/173 |

OTHER PUBLICATIONS

The British Library "Turning the Pages" http://wwwlbl.uk/collections/treasures/about.html, found May 13, 2008 p. 1.
Levin et al. "Starbursts; eBook Reader", http://www.enlev.com/basick-interation/eBook/10sketches.pdf, published Apr. 14, 2008 p. 1-14.

* cited by examiner

*Primary Examiner* — Benjamin C Lee
*Assistant Examiner* — Curtis King
(74) *Attorney, Agent, or Firm* — Sony Corporation

(57) ABSTRACT

In one embodiment, a method for providing feedback for a page turn requested on a device is provided. The device may be an electronic book (e-book) device or another device that is configured to display electronic documents. A movement on the display of the device is detected. The method determines that a page turn of the document is being requested based on the movement on the display. The method determines a light-based feedback to indicate that a page turn is being processed. The computing time to process a page turn and display a new page may be slow as perceived by the user. Accordingly, the light-based feedback is used to indicate to the user that the page turn has been received. A plurality of light sources are used to provide the light-based feedback based on a location of the movement. For example, as a user swipes a finger across a display, light sources that follow the motion of the finger are illuminated to simulate a page turn.

20 Claims, 4 Drawing Sheets

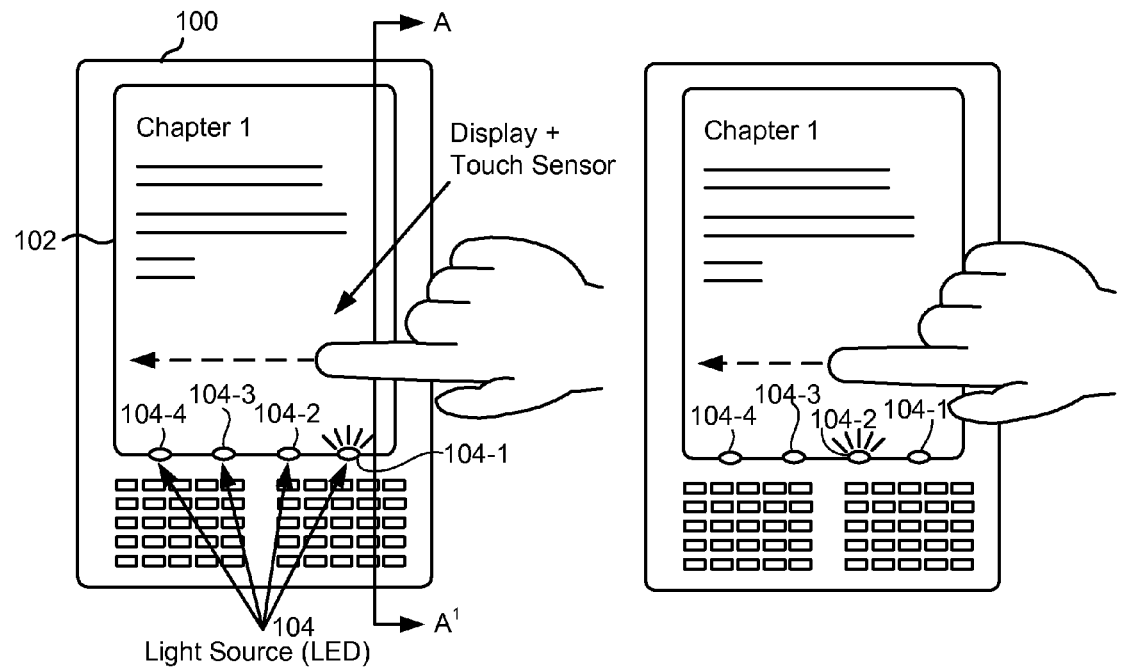
Fig. 1A
Fig. 1B
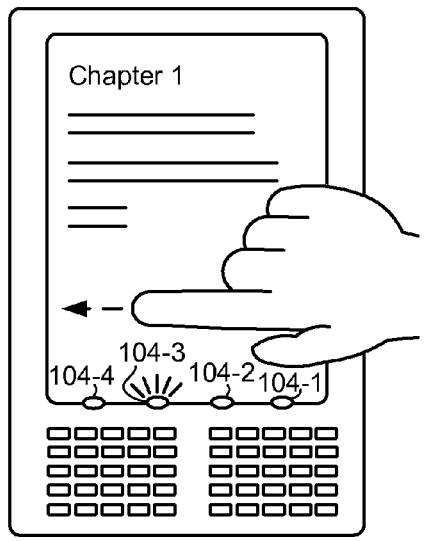
Fig. 1C
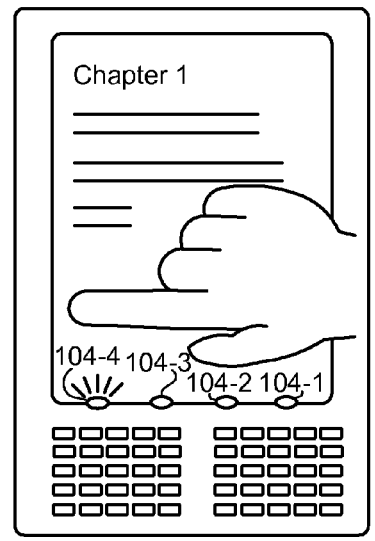
Fig. 1D

FEEDBACK WITH FRONT LIGHT

BACKGROUND

Particular embodiments generally relate to portable devices configured to display electronic documents.

When reading an electronic document using an electronic book reading device or other portable device, the user uses an indication to request a page turn. The page turn may be requested by pressing a designated button or using a swiping motion where a user rubs his/her finger over the display of the device. The page turn is typically a labor-intensive operation for a processor that may take some time to generate a new page. In a user's mind, he/she may not know that the page turn request has been received because the device is processing the request to display a next page. Accordingly, some users may question whether they should request a page turn again. This may become frustrating for a user.

SUMMARY

In one embodiment, a method for providing feedback for a page turn requested on a device is provided. The device may be an electronic book (e-book) device or another device that is configured to display electronic documents. A movement on the display of the device is detected. For example, a movement of a finger or other pointing device may be detected. The method determines that a page turn of the document is being requested based on the movement on the display. For example, a user may be moving his/her finger across the display, the movement of which is determined to be requesting a page turn. The method determines a light-based feedback to indicate that a page turn is being processed. The computing time to process a page turn and display a new page may be slow as perceived by the user. Accordingly, the light-based feedback is used to indicate to the user that the page turn has been received. A plurality of light sources are used to provide the light-based feedback based on a location of the movement. For example, as a finger is moved across a display, light sources corresponding to the location of the movement are determined and light sources are illuminated. For example as a user swipes his/her finger across a display, light sources that follow the motion of the finger are illuminated to simulate a page turn.

A further understanding of the nature and the advantages of particular embodiments disclosed herein may be realized by reference of the remaining portions of the specification and the attached drawings.

BRIEF DESCRIPTION OF THE DRAWINGS

FIGS. 1A-1D depict an example of a device for reading a document according to one embodiment.

DETAILED DESCRIPTION OF EMBODIMENTS

Figure 2:
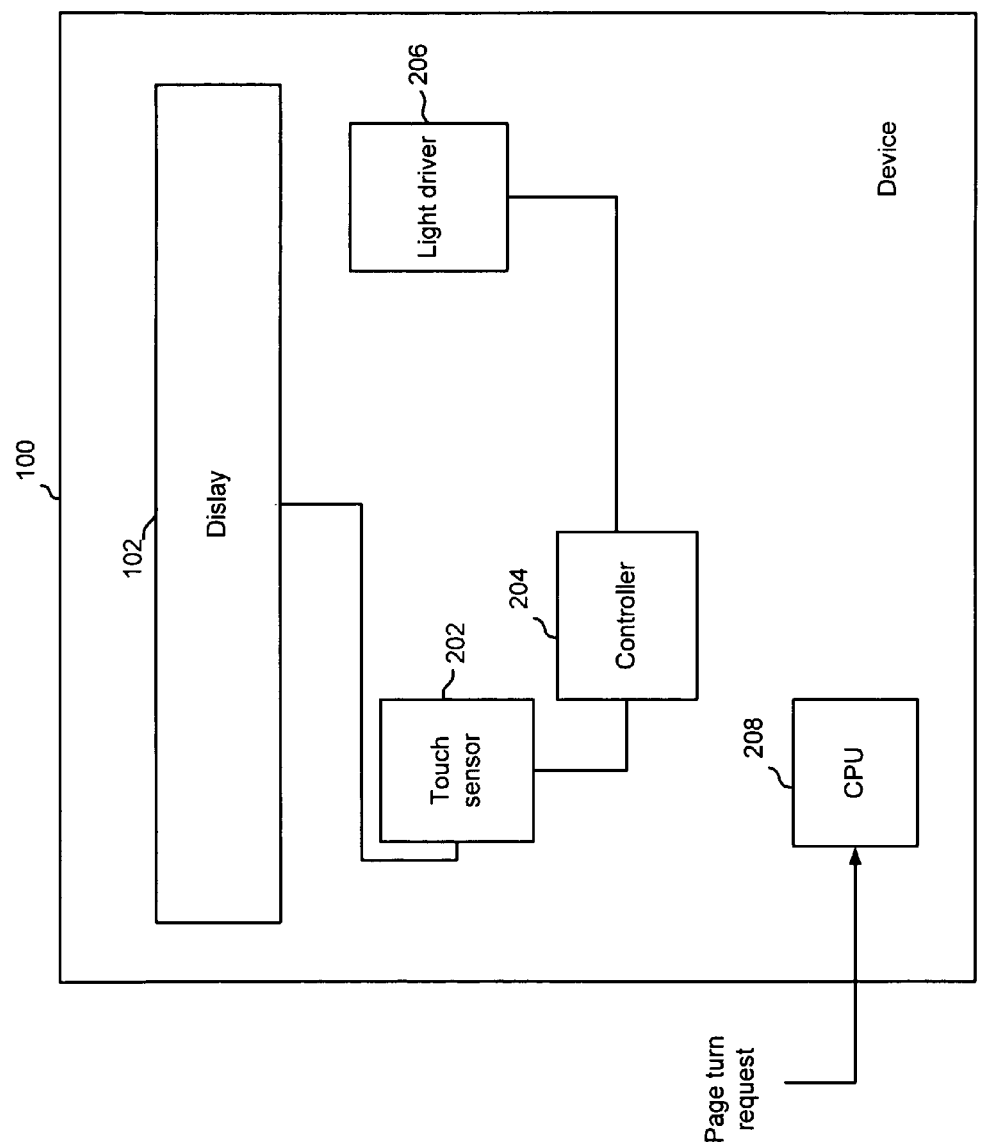
FIG. 2 depicts a more detailed example of the device according to one embodiment.

FIGS. 1A-1D depict an example of a device 100 for reading a document according to one embodiment. Device 100 may be an electronic device that is configured to display electronic documents. The documents may be displayed using electronic ink, such as e-ink™. Electronic ink may be where ink is printed onto a sheet of plastic film that is laminated to a layer of circuitry. The circuitry forms a pattern of pixels that can be controlled by a display driver. Microcapsules are suspended in a liquid carrier medium allowing them to be printed using existing screen printing processes onto any surface.

An electronic document may be any digital or electronic file that is used to display text, images, or multimedia. The electronic document may have a plurality of pages that a user can page through (i.e., turn the pages). In one example, the electronic document is an electronic book (e-book). Electronic books may be any documents that may include text, images, or other multimedia information.

In one embodiment, device 100 may be an electronic-book reader. An e-book reader may be a device that is used to display electronic books. An e-book device may be specially designed for displaying e-books. However, device 100 may also be intended for other purposes as well, such as device 100 may be a smart phone, cellular phone, personal digital assistant (PDA), personal computer, laptop computer, or other computing devices suitable for displaying electronic documents or e-books.

Device 100 includes a display 102 and a plurality of light sources 104. Display 102 may be a screen that can display the electronic document. As shown on display 102, text for an e-book is shown. In one example, a user may be reading an e-book that is shown on display 102.

Light sources 104 may be any light sources, such as light emitting diodes (LED) or any other light emitting source. Light sources 104 include characteristics that can be altered. For example, light source 104 may emit any color and/or different intensities. In one example, light source 104 may be a colored light or white light. Also, light source 104 may be configured to be turned on and off or emit different intensities of light. These characteristics can be altered to provide feedback for a page turn.

Light sources 104 may be situated in different areas of device 100. As shown, light sources 104 are found on the bottom of device 100. Although light sources 104 are shown on the bottom of device 100, it will be understood that they can be situated in other areas of device 100. For example, the lights may be situated on the side of device 100, dispersed under display 102, or in any other area of device 100. As will be described in more detail below, light sources 104 may be used to provide light-based feedback.

Display 102 includes a touch sensor. For example, display 102 may be a touch-sensitive display screen that is displaying the electronic document. Also, another area on device 100 may be used as a touch-sensitive area, such as a touchpad area. Any area that can be used to request a page turn may be referred to as a display. The touch-sensitive area is configured to detect a touch from a pointing device, such as a user's finger, stylus, or other device. The motion of the pointing device can be detected. For example, a user's finger may be moved along the motion indicated in FIG. 1A across device 100.

When a page turn is requested, processing the page turn to display another page may be considered slow by a user. If feedback is not given to a user, the user may question whether the page turn request has been received and that a new page is going to be displayed. Accordingly, particular embodiments provide light-based feedback to a user. The light-based feedback may be provided by altering a characteristic of light sources 104 when a page turn request is detected. The touch sensor detector senses the movement of a fingertip. As a fingertip moves, light sources 104 change intensity so that an area associated with where the fingertip is pointing is illuminated with a higher (or lower) intensity as compared to other areas. In other embodiments, the area surrounding the fingertip may be illuminated and as the finger is moved, the illuminated area follows the fingertip. Also, light sources 104 may be located on the bottom or side and may be illuminated with a higher or lower intensity that corresponds to a movement of the finger. Further, other characteristics of light sources 104 may be changed, such as light sources may be turned on and off, light sources may change color, or other characteristics may be changed.

FIG. 1A shows an example where a user's finger has been detected touching display 102. The user's finger is being moved across the screen and is positioned as currently displayed. As shown, light source 104-1 is illuminated. This provides feedback to a user that the page turn request has been received and is being processed.

The user's motion may be a continuous motion across screen 102. The original touch may be detected and then a motion in a direction is also detected. This may indicate to a processor that a page turn is being requested. FIG. 1B shows an example of a user's finger after being moved across display 102. As shown, a light source 104-2 has been illuminated. In this case, light source 104-1 may stay illuminated or may be dimmed.

FIG. 1C shows the user's finger after being moved to yet another position. As shown, light source 104-3 has been illuminated. Accordingly, light sources 104 are illuminated in a way that follows the finger motion. FIG. 1D shows the finishing of a user's finger motion. As shown, a light source 104-4 has been illuminated. Thus, as a user moves his/her finger across display 102, light sources are illuminated according to the motion and location of the finger on display 102. By moving the illumination of light sources 104 and the motion of the finger, the lights simulate a page turn for a user. For example, to request a page turn, a user moves his/her finger in a motion that would be performed as if the user was turning a page of a physical book. In this case, the lights illuminate in a same motion that simulates a movement of a physical page being turned. This provides feedback to the user that the page turn is upcoming and also may be perceived as the page being turned. The user may not think the page turn or display of a new page is long because seeing the feedback makes the user think the physical page is being turned and then the new page can be displayed.

FIG. 2 depicts a more detailed example of device 100 according to one embodiment. As shown, a touch sensor detector 202, a controller 204, and a light source driver 206 are provided. Touch sensor detector 202 is configured to detect motion from display 102. The motion that may be detected may be a touching of display 102. In one example, the touch is detected using a capacitive touch sensor. A capacitive touch sensor senses a change in capacitance. For example, as a finger nears an electric field, the finger can be sensed by a change in capacitance caused by the finger. A capacitive touch sensor is known and thus is not described in further detail. It will be understood that other methods of detecting motion and touch will also be appreciated.

Controller 204 is configured to determine that a page turn has been requested and to provide the light-based feedback. Controller 204 determines how the light-based feedback should be output. For example, based on a location detected for the motion, different characteristics of light sources 104 may be changed. Controller 204 may be different from a CPU 208 of device 100. For example, controller 204 may be a controller for a touch panel of device 100. That is, controller 204 is configured to process information received from the touch-sensitive screen. Controller 204 may be used to provide the light-based feedback. This may offload processing of the light-based feedback operations from CPU 208. CPU 208 may be the processor that is used to provide the page turn and other operations for device 100. Offloading the light-based feedback computation provides more efficient outputting of feedback does not interfere with the page turn.

When the feedback is determined, light driver 206 is contacted to alter characteristics of light sources 104. For example, light driver 206 may illuminate a series of light sources 104 depending on the motion detected. As described above, a location detected for a user's finger is used to determine which light sources 104 to illuminate.

Figure 3:
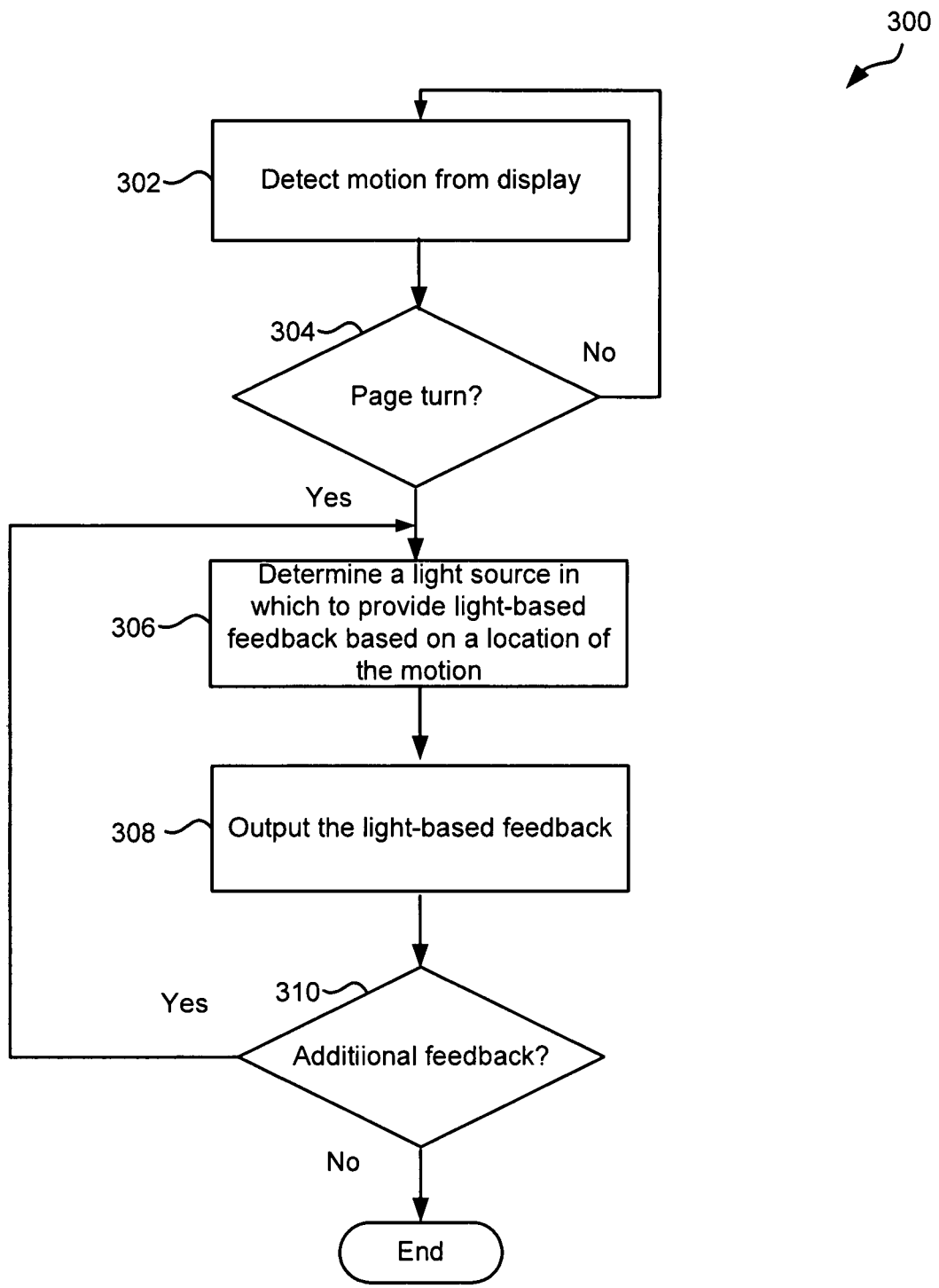
FIG. 3 depicts a simplified flow chart of a method for providing light-based feedback according to one embodiment.

FIG. 3 depicts a simplified flow chart 300 of a method for providing light-based feedback according to one embodiment. Step 302 detects motion from display 102. The motion may be a touching of display 102.

Step 304 determines if the motion is requesting a page turn. For example, different motions may be provided and certain motions may trigger a page turn request. If a page turn is not requested, the process reiterates to step 302 to continue to detect for a page turn.

If a page turn is detected, step 306 determines a light source 104 in which to provide light-based feedback based on a location of the motion.

Step 308 outputs the light-based feedback. For example, a characteristic of a light source 104 may be altered. Step 310 then determines if additional feedback should be outputted. For example, as the user's finger is moved across display 102, additional light sources 104 may be illuminated. The process then reiterates to step 306 where additional light-based feedback may be determined based on the location of the motion.

Figure 4:
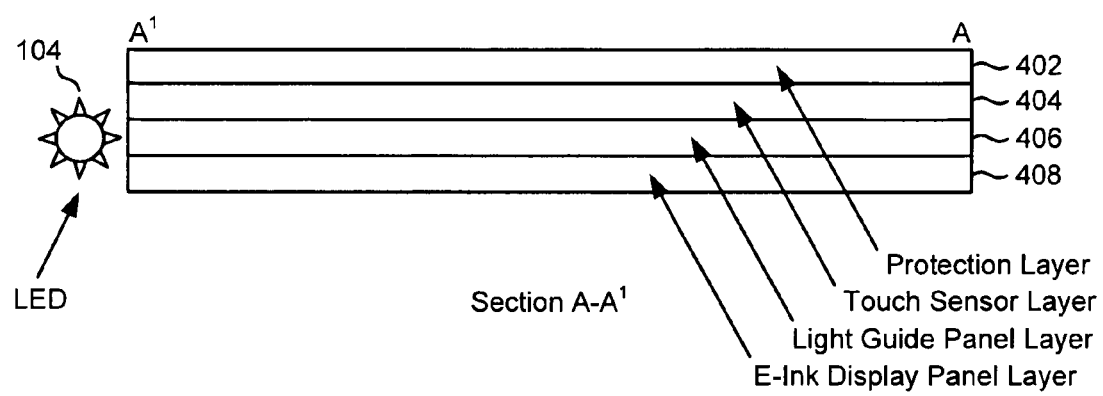
FIG. 4 depicts a side view of the device according to one embodiment.

FIG. 4 depicts a side view at A-A$^1$ of device 100 according to one embodiment. As shown, a protection layer 402 is the top surface of display 102. A touch sensor layer 404 is used to detect a touching of display 102. The touch sensor layer may be a capacitive touch sensor or any other touch sensor layer. A light guide panel layer 406 is provided. The light guide panel layer is used to illuminate display 102. Different light sources 104 may be provided in this layer. For example, light sources 104 may be dispersed throughout display 102.

An electronic ink display panel layer 408 is provided to display information from an electronic document. For example, electronic ink provides an electronic paper display that possesses paper-like high contrast appearance in a thin light form. This provides the user with an experience of reading from paper. Electronic ink carries a charge that enables it to be updated through electronics. Electronic ink may be provided by E-ink, Incorporated.

Particular embodiments provide many advantages. For example, feedback is provided that alerts a user that a page turn request has been received. The feedback also simulates a page turn and helps a user sense that the current operation is a page turn. The lights that are used require little processing power but simulate a page turn that provides a reading experience of a real book. The concept of using a motion to request a page turn is also easy to understand as a user can easily touch and slide his/her finger on display 102. Because of the slow refresh rate of a display, animation of a page-turn motion on the display may not be possible. Accordingly, the light-based feedback is helpful when a user's motion is detected.

Although the description has been described with respect to particular embodiments thereof, these particular embodiments are merely illustrative, and not restrictive. Although an e-book reader is described, it will be understood that other devices may be used.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

I claim:

1. A method for providing feedback for a page turn on an electronic ink device, the method comprising:
    detecting a movement on a display of the electronic ink device while displaying an electronic document on the display;
    determining that a page turn of the electronic document is being requested based on the movement on the display;
    determining a portion at least two light sources of a plurality of light sources of the display to provide light-based feedback based on a position and direction of the detected movement on the display; and
    illuminating the at least two light sources of the plurality of light sources in sequence, the sequence corresponding to the position and the direction of the detected movement, wherein the light based feedback simulates the page turn and indicates that the page turn has been received and is being processed.

2. The method of claim 1, wherein the movement detected on the display is in a first direction, wherein the light-based feedback comprises changing a characteristic of the at least two light sources of the plurality of light sources to follow the detected movement in the first direction.

3. The method of claim 2, wherein the at least two light sources that have characteristics changed correspond to a position of the detected movement.

4. The method of claim 1, wherein the light-based feedback comprises turning the plurality of light sources on or off to indicate the page turn has been received.

5. The method of claim 1, wherein the light-based feedback comprises altering an intensity of the plurality of light sources to indicate the page turn has been received.

6. The method of claim 1, wherein detecting the movement comprises detecting a touch on the display in a first direction.

7. The method of claim 1, wherein a controller is used to determine the page turn is being requested and a driver of the plurality of lights is used to output the light-based feedback.

8. The method of claim 7, wherein the controller is separate from a CPU processing the page turn request.

9. The method of claim 1, wherein the plurality of light sources is positioned along an edge of the display.

10. The method of claim 1, wherein the plurality of light sources is positioned along a bottom edge and/or a side edge of the display.

11. An electronic ink device configured to provide feedback for a page turn comprising:
    one or more processors operable to:
        detect a movement on a display of the electronic ink device while displaying an electronic document on the display, wherein the electronic document is displayed using an electronic ink display panel layer and the display is illuminated using a plurality of light sources in a light guide panel layer;
        determine that a page turn of the electronic document is being requested based on the movement on the display;
        determine at least two light sources of the plurality of light sources to provide light-based feedback based on a position and direction of the detected movement on the display, wherein the at least two light sources of the plurality of light sources are dispersed in the light guide panel layer to provide the light-based feedback for the page turn; and
    illuminating the at least two light sources of the plurality of light sources in sequence, the sequence corresponding to the position and the direction of the detected movement, wherein the light-based feedback simulates the page turn and indicates that the page turn has been received and is being processed.

12. The electronic ink device of claim 11, wherein the movement detected on the display is in a first direction, wherein the light-based feedback comprises changing a characteristic of light sources in the plurality of light sources to follow the movement in the first direction.

13. The electronic ink device of claim 12, wherein light sources that have characteristics changed correspond to a position of the detected movement.

14. The electronic ink device of claim 11, wherein the light-based feedback comprises turning the plurality of light sources on or off to indicate the page turn has been received.

15. The electronic ink device of claim 11, wherein the light-based feedback comprises altering an intensity of the plurality of light sources to indicate the page turn has been received.

16. The electronic ink device of claim 11, wherein the one or more processors are further operable to detect a touch on the display in a first direction.

17. The electronic ink device of claim 11, wherein the one or more processors are used to determine the page turn is being requested and a driver of the plurality of lights is used to output the light-based feedback.

18. The electronic ink device of claim 17, wherein the one or more processors are separate from a CPU processing the page turn request.

19. The electronic ink device of claim 11, wherein the determined portion of the plurality of light sources is positioned along an edge of the display.

20. An apparatus configured to provide feedback for a page turn on an electronic ink device, the apparatus comprising:
 a touch sensor detector configured to detect a movement on a display of the electronic ink device while displaying an electronic document on the display, wherein the electronic document is displayed using an electronic ink display panel layer and the display is illuminated using a plurality of light sources in a light guide panel layer;
 a controller operable to:
  determine that a page turn of the electronic document is being requested based on the movement on the display;
 a light driver configured to:
  determine at least two light sources of the plurality of light sources to provide light-based feedback based on a position and direction of the detected movement on the display, wherein the at least two light sources of the plurality of light sources are dispersed in the light guide panel layer to provide the light-based feedback for the page turn; and
 illuminating the at least two light sources of the plurality of light sources in sequence, the sequence corresponding to the position and the direction of the detected movement, wherein the light-based feedback simulates the page turn and indicates that the page turn has been received and is being processed.

* * * * *